(12) United States Patent
Chambers et al.

(10) Patent No.: US 9,570,078 B2
(45) Date of Patent: Feb. 14, 2017

(54) TECHNIQUES TO PROVIDE A STANDARD INTERFACE TO A SPEECH RECOGNITION PLATFORM

(75) Inventors: Robert L. Chambers, Sammamish, WA (US); Michael Bodell, Redmond, WA (US); Daphne Luong, Redmond, WA (US); Annie Wong, Redmond, WA (US); Faustinus K. Gozali, Redmond, WA (US); Andrew Ho, Redmond, WA (US); Rod Philander, Redmond, WA (US); Corby Anderson, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1130 days.

(21) Appl. No.: 12/488,161

(22) Filed: Jun. 19, 2009

(65) Prior Publication Data
US 2010/0324910 A1 Dec. 23, 2010

(51) Int. Cl.
*G10L 15/30* (2013.01)
(52) U.S. Cl.
CPC ..................... *G10L 15/30* (2013.01)
(58) Field of Classification Search
CPC ........ G10L 15/22; G10L 15/265; G10L 15/30; G10L 13/043; G10L 17/22; G10L 21/00; G06F 17/2765
USPC ...................................................... 704/270.1
See application file for complete search history.

(56) References Cited

U.S. PATENT DOCUMENTS

| | | | |
|---|---|---|---|
| 6,456,974 B1 | 9/2002 | Baker et al. | |
| 7,382,770 B2 * | 6/2008 | Bergman et al. | 370/352 |
| 7,409,349 B2 | 8/2008 | Wang et al. | |
| 7,724,888 B1 * | 5/2010 | Bush et al. | 379/221.01 |
| 2002/0128845 A1 * | 9/2002 | Thomas et al. | 704/270.1 |
| 2004/0107107 A1 * | 6/2004 | Lenir et al. | 704/270.1 |
| 2007/0156682 A1 * | 7/2007 | Howell et al. | 707/6 |
| 2008/0065387 A1 | 3/2008 | Cross, Jr. et al. | |
| 2010/0057451 A1 * | 3/2010 | Carraux | G10L 15/30 704/231 |

OTHER PUBLICATIONS

Carpenter, et al., "Server-Side Dialog Framework for VoiceXML", Retrieved at <<http://www.colloquial.com/carp/Publications/ICSLP02.doc>>, Interspeech, 2002, pp. 4.

(Continued)

*Primary Examiner* — Angela A Armstrong
(74) *Attorney, Agent, or Firm* — Steven J. Spellman; Fehmi Chebil; Micky Minhas

(57) ABSTRACT

Techniques and systems to provide speech recognition services over a network using a standard interface are described. In an embodiment, a technique includes accepting a speech recognition request that includes at least audio input, via an application program interface (API). The speech recognition request may also include additional parameters. The technique further includes performing speech recognition on the audio according to the request and any specified parameters; and returning a speech recognition result as a hypertext protocol (HTTP) response. Other embodiments are described and claimed.

19 Claims, 7 Drawing Sheets

(56) References Cited

OTHER PUBLICATIONS

"Dialogos Voice Platform", Retrieved at <<http://www.speech.gr/res/dialogos_dvp_specsheet_en.pdf>>, Sep. 2007, pp. 12.
Xu, et al., "A Configurable Distributed Speech Recognition System", Retrieved at <<http://kom.aau.dk/~zt/doc/Xu_DSP05.pdf>>, 2000, pp. 5.
Brown, Robert, "Exploring New Speech Recognition and Synthesis APIs in Windows Vista", Retrieved at <<http://msdn.microsoft.com/en-us/magazine/cc163663.aspx>>, Retrieved Date: Apr. 14, 2009, pp. 8.
"LumenVoxSpeech Engine", Retrieved at <<http://www.lumenvox.com/products/speech_engine/>>, Retrieved Date: Apr. 14, 2009, pp. 2.

\* cited by examiner

```
/reco?grammarl=http%3A%2F%2Fexample.tellme.com%2Fgrammar.grxml&audio=http%3A%2F%2Fexample.tellm
e.com%2Faudio.wav HTTP/1.0
Host: reco.tellme.com
```

```
1  POST /reco HTTP/1.0
2  Host: reco.tellme.com
3  Content-Length: 106
4  Content-Type: application/x-www-form-urlencoded
5
6  grammarl=http%3A%2F%2Fexample.tellme.com%2Fgrammar.grxml&audio=http%3A%2F%2Fexample.tellme.com%2Faudio.wav
```

TECHNIQUES TO PROVIDE A STANDARD INTERFACE TO A SPEECH RECOGNITION PLATFORM

BACKGROUND

A growing number of applications and devices make use of speech recognition functions to enhance the usability of the applications. However, speech recognition applications and resources can be expensive to create, and may be too resource-intensive to fit on smaller portable devices. Network hosted speech recognition services may have application program interfaces (APIs) that may require a high level of skill to integrate with other applications. Some speech recognition services may not work across engine implementations, or device boundaries, e.g. desktop, server, or embedded.

It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques and systems to provide a standard interface for speech recognition operations over a network. In one embodiment, for example, a technique includes accepting a speech recognition request that includes at least audio input, via an application program interface (API). The speech recognition request may also include additional parameters. The technique further includes performing speech recognition on the audio according to the request and any specified parameters; and returning a speech recognition result as a hypertext protocol (HTTP) response. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 4 illustrates an embodiment of a speech request.
FIG. 5 illustrates an embodiment of a second speech request.

DETAILED DESCRIPTION

Various embodiments are directed to techniques and systems to provide a standards-based interface that takes a request from a client for speech recognition and returns a speech recognition result in a standard format. Embodiments may provide a hypertext protocol (HTTP) based interface to a speech recognition system, such that any client with access to audio information, grammars, and a standard HTTP compliant client may request and receive speech recognition services.

Figure 1:
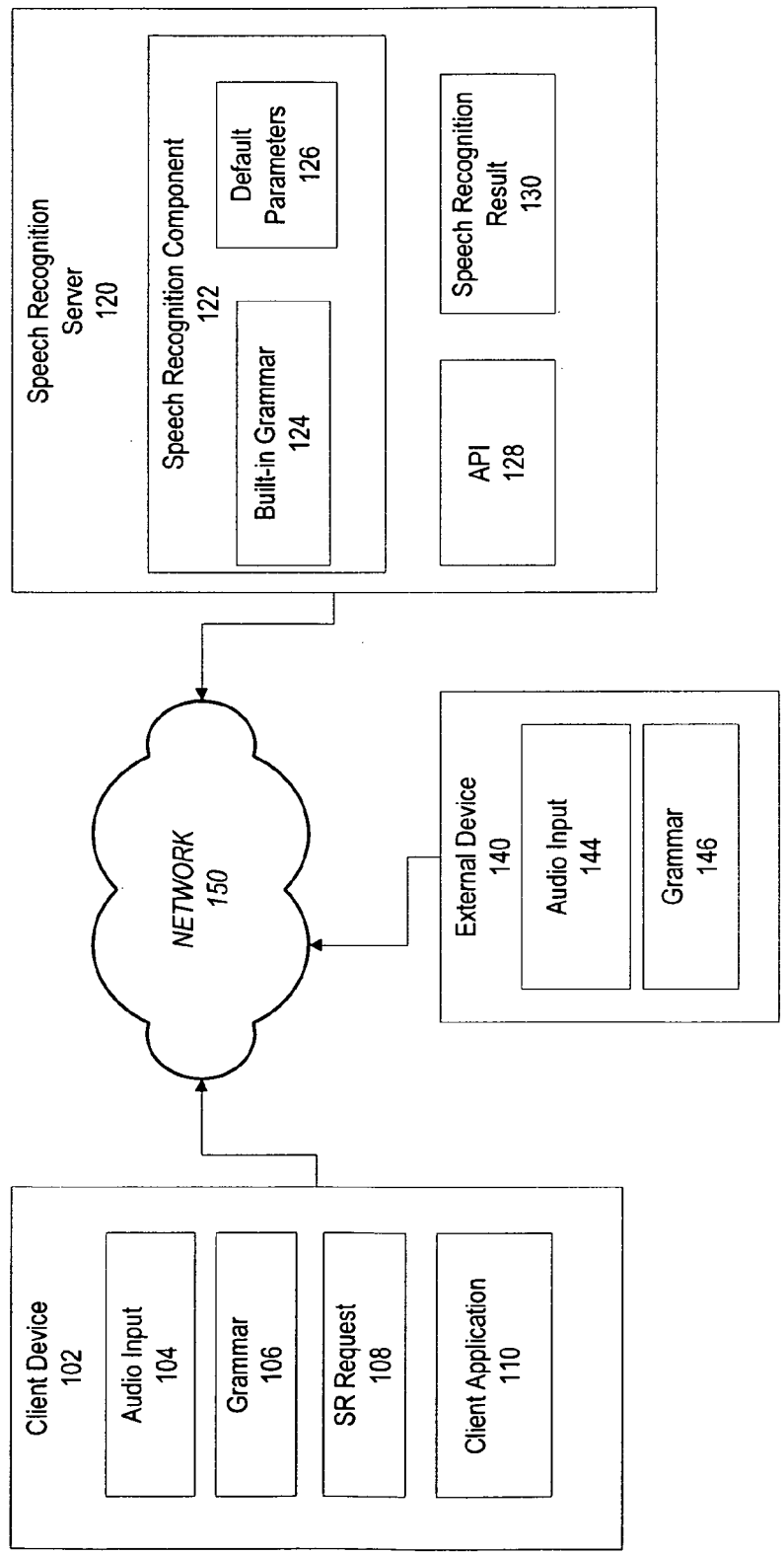
FIG. 1 illustrates an embodiment of a first system.

FIG. 1 illustrates a block diagram for a system 100 to provide a standard interface for speech recognition services. In one embodiment, for example, the system 100 may comprise a computer-implemented system 100 having multiple components, such as client device 102 and speech recognition server 120. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

The components may be communicatively coupled via various types of communications media. The components may coordinate operations between each other. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In various embodiments, the system 100 may include a client device 102. Client device 102 may be an electronic device. Client device 102 may include audio input 104 and one or more grammars 106. Audio input 104 and grammar 106 may be stored on a storage medium (not shown) within client device 102.

Client device 102 may further include a client application 110 that may require or make use of speech recognition. Client application 110 may be, for example but not limited to, a transcription application, a telephone voice dialing application, a search engine, etc.

Client device 102 may be operative to create a speech recognition request 108, for example, on behalf of client application 110. Speech recognition request 108 may include at least an audio input for recognition. Speech recognition request 108 may include one or more additional parameters, and is discussed further below with respect to FIG. 2.

System 100 may further include a speech recognition server 120. Speech recognition (SR) server 120 may generally provide speech recognition services to clients, such as client device 102. SR server 120 may include a speech recognition component 122. SR component 122 may be an SR engine or application capable of transforming speech in the form of audio content into machine-readable or human-readable text. SR component 122 may include or have access to a built-in grammar 124 and may have a set of default parameters 126. Built-in grammar 124 may serve as a default grammar for speech recognition if no other grammar is supplied. Similarly, default parameters 126 may include default speech recognition settings used by SR component 122 when performing speech recognition. SR server 120 may communicate with other devices, such as client device 102 via network 150.

SR server 120 may further include an application program interface (API) 128. API 128 may provide a standard HTTP-based interface that clients may use to request and receive speech recognition services. In an embodiment, API 128 may be relatively easy to understand, by conforming to standard web service request/response idioms and using standard formats for request and response bodies. API 128 may be a scalable, hosted platform service, and/or may be an embedded API. API 128 may be extensible such that that new speech parameters or recognizer inputs/outputs may be easily added.

In an embodiment, SR server 120, via API 128, may accept inputs that are query parameters or inline body parts, perform speech recognition based on those inputs, and return a speech recognition result 130. SR result 130 may be an extensible markup language (XML) document in Extensible MultiMedia Annotation (EMMA) format, and may include a success or failure status, and, in the case of a success, speech recognition results. SR result 130 may also contain additional semantic information, such as but not limited to, application-specific content associated with a recognition alternative, or a search result based on the recognized speech.

API 128 may be implemented in many different contexts, and may be exposed as many different API endpoints. Consequently, there may be no single fixed hostname or uniform resource identifier (URI) which identifies API 128. In this document, "http://webreco.tellme.com/reco" may be used as an example URI which can be used to reach a hosted API 128 endpoint.

API 128 may provide various wrappers to API endpoints to use when building and sending a speech request 108. The wrappers may include, for example, but not limited to, a JavaScript wrapper, a .NET wrapper, a Silverlight wrapper, a System.Speech wrapper, etc.

System 100 may include additional devices, such as external device 140. External device 140 may be an electronic device or storage device that may store audio input 144 and/or grammar 146. In an embodiment, client device 102 may link to audio input 144 and/or grammar 146 when requesting speech recognition services from SR server 120. External device 140 may be accessible to both client device 102 and SR server 120 via network 150.

Although depicted as separate devices, client 102 and SR server 120 may operate on the same physical device, such as a desktop computer.

Figure 2:
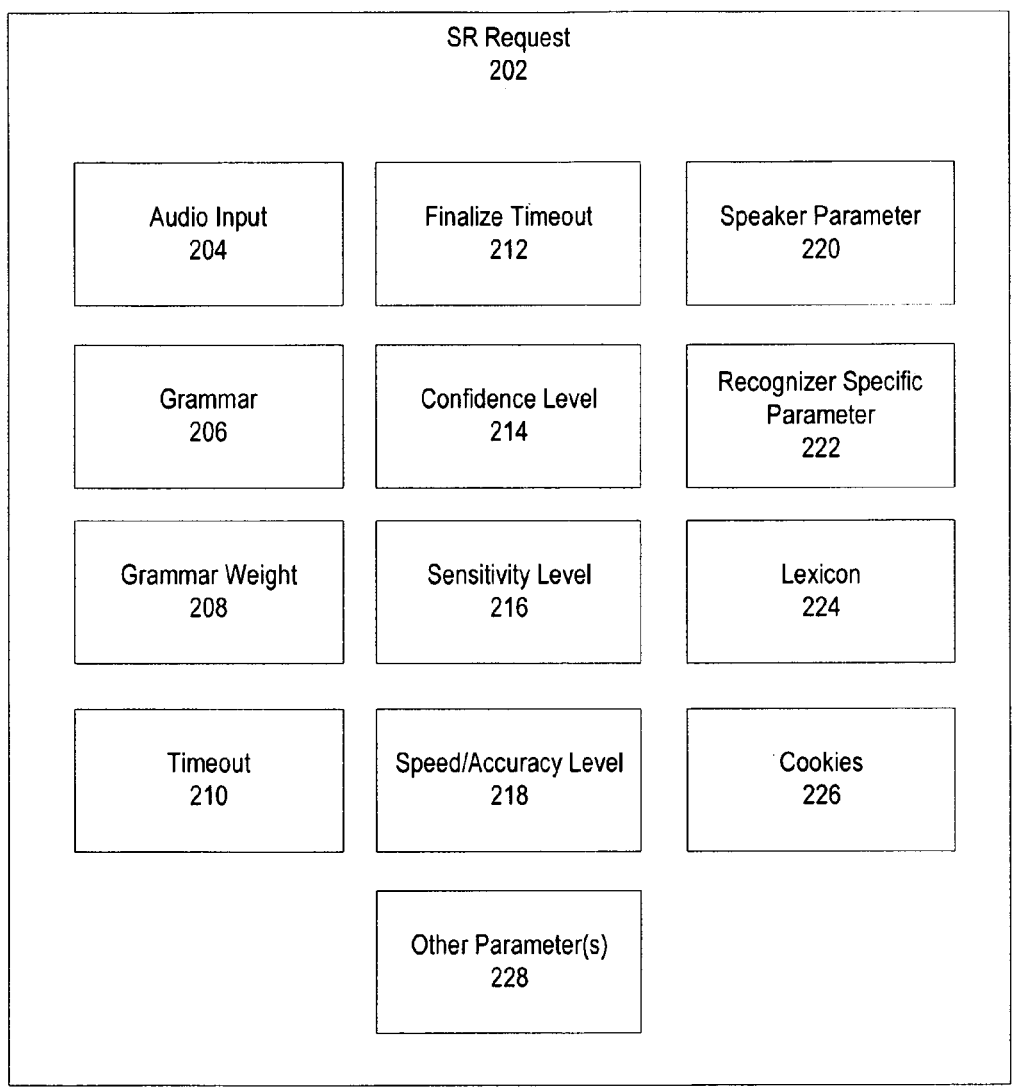
FIG. 2 illustrates an embodiment of a speech request.

FIG. 2 illustrates a block diagram 200 of parameters that a speech recognition (SR) request 202 may include. SR request 202 may take the form of an HTTP URI query string, an HTTP POST entity body, or one or more body parts of an HTTP POST entity body. In an embodiment, SR request 202 may be similar to an XMLHTTPRequest object, from AJAX. For example, SR request 202 may be made from a web browser as an XMLHTTPRequest. In an embodiment, SR request 202 may be made from a command line request or from a different program.

SR request 202 may include an audio input 204 parameter. Audio input 204 may be a URI which identifies audio content, or actual audio content included inline in an HTTP POST multipart body part. The format of the audio content may be, for example, WAV, GSM610, or any format supported by the recognizer that will perform the speech recognition. In an embodiment, audio input 204 may be accompanied by a content-type indicator that identifies the type of the audio content.

SR request 202 may include a grammar 206 parameter. Grammar 206 may be a URI that identifies a grammar resource, which may be a grammar source file or a compiled binary grammar. Grammar 206 may be an actual grammar resource included inline in an HTTP POST MIME multipart body part. For example, grammar 206 may include grammar 106, and/or grammar 146, or a URI that identifies grammar 106, and/or grammar 146. More than one grammar may be included in SR request 202. If no grammar is included, SR component 122 may use built-in grammar 124.

Grammar 206 may also include references to other grammars. Many grammar formats include a mechanism to reference subsidiary resources; for example, a grammar may load a subgrammar via a <ruleref/> tag with a uri attribute that contains an HTTP URI. Grammar 206 may permit a grammar that is specified inline or remotely fetched via URI to reference content that is specified inline in the SR request.

To allow inter-grammar references, embodiments may use a new URI scheme to disambiguate between URIs that might be fetched from inline body parts, versus URIs that are fetched from an external source. The body of the URI scheme may be any valid URI, and may be expressed, for example, as a "token" or "quoted-string".

SR request may include a grammar weight 208 parameter. Grammar weight 208 may specify the degree to which a grammar is preferred relative to other grammars being active during the same recognition. If more than one grammar is included in grammar 206, more than one grammar weight 208 may also be included.

SR request 202 may include a timeout 210 parameter. Timeout 210 may indicate a length of initial silence in an audio stream before a "noinput" is returned. Timeout 210 may allow SR component 122 to cut processing short and return a noinput after only processing a specified duration of audio, which may reduce the amount of audio being read from the remote URI or inline body part.

SR request 202 may include a finalize timeout 212 parameter. Finalize timeout 212 may indicate a length of silence to observe before the recognizer finalizes a result, either by accepting the result, or indicating that no match was found.

SR request 202 may include a confidence level 214 parameter. Confidence level 214 may set a confidence threshold below which results may be discarded.

SR request 202 may include a sensitivity level 216 parameter. Sensitivity level 216 may adjust the recognizer's sensitivity to noise.

SR request 202 may include a speed/accuracy level 218 parameter. Speed/accuracy level 218 may adjust a balance between faster recognition and improved accuracy.

SR request 202 may include a speaker parameter 220. Speaker parameter 220 may provide information to the recognizer about the speaker of the audio content, such as age, gender, etc.

SR request 202 may include a recognizer specific parameter 222. Recognizer specific parameter 222 may include parameters that are needed by, or are optional for, a particular recognizer. Recognizer specific parameter 222 may select a specific recognizer to use.

SR request 202 may include a lexicon 224 for use in speech recognition. Lexicon 224 may define pronunciation information for many words or phrases and may be used to inform recognition.

SR request 202 may include a cookie header 226 parameter. Cookie header 226 may allow an operator calling API 128 to include particular HTTP cookie headers for fetches of remote URIs, whether they are for grammar or content. Cookie headers may be necessary for a remote URI fetch that is protected by a cookie based authentication mechanism, or any other framework which requires parameters to be delivered via HTTP cookies instead of URI query parameters.

SR request 202 may include other parameters 228 that may customize or otherwise alter the performance of SR component 122. The embodiments are not limited to the parameters shown in FIG. 2. Further, any or all of the parameters shown herein may be included in a SR request, and multiple instances of any one parameter may also be included.

Figure 3:
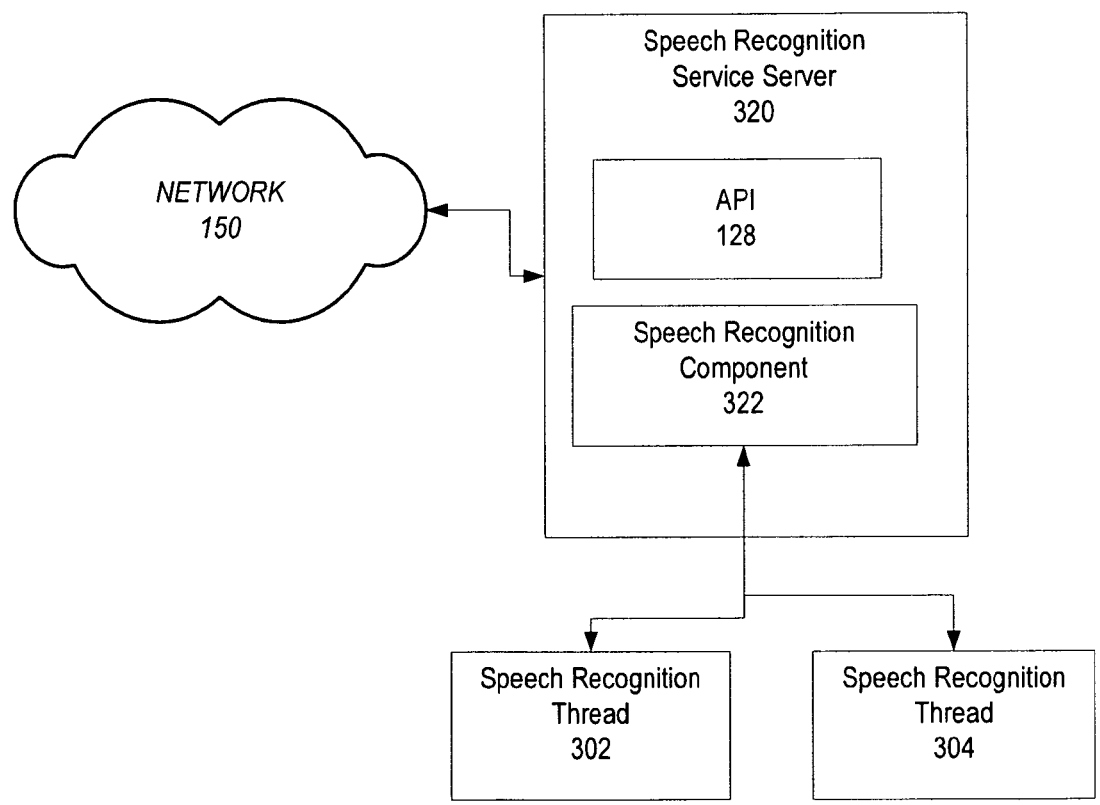
FIG. 3 illustrates an embodiment of a second system.

FIG. 3 illustrates an embodiment of a system 300. System 300 may include a SR service server 320 that may provide speech recognition functions. Incoming requests, such as a speech request 108, may be serviced via a distributed or threaded system. SR component 322 may divide the speech recognition task among one or more speech recognition threads, e.g. SR thread 302 and SR thread 304. Alternatively, SR component 322 may divide the speech recognition task across multiple devices or processors. System 300 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

FIG. 4 illustrates an example of an SR request 400. SR request 400 is written as an HTTP request, with a single grammar and single audio input that may be fetched from an existing URI. In this example, grammar 206 indicates the location of the grammar as: http://example.tellme.com/grammar.grxml. Audio input 204 indicates the location of the audio input as: http://example.tellme.com/audio.wav.

FIG. 5 illustrates an example of an SR request 500. SR request 500 is written as an HTTP POST command. SR request 500 conveys the same grammar 206 and audio 204 as illustrated in SR request 400 of FIG. 4. SR request 500 also indicates the same host, on line 2, as shown in SR request 400. The host may be an HTTP header that specifies the host (and optionally port) of the resource being requested, which in this case is the dynamic SR request.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 6:
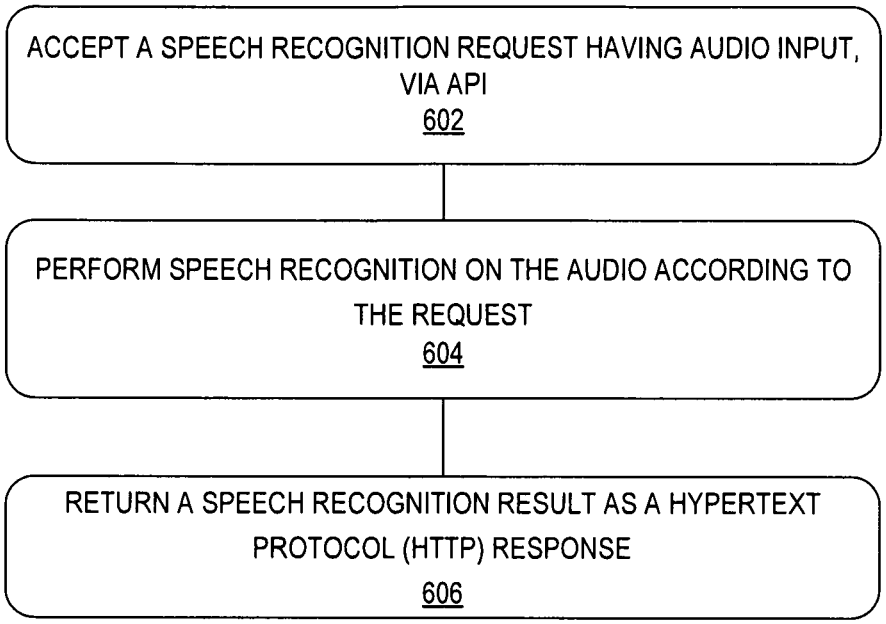
FIG. 6 illustrates an embodiment of a logic flow.

FIG. 6 illustrates one embodiment of a logic flow 600. The logic flow 600 may be representative of some or all of the operations executed by one or more embodiments described herein.

Logic flow 600 may accept a speech recognition request having an audio input via an API, in block 602. For example, SR server 120 or SR service server 320 may receive an SR request 108 constructed according to API 128. The SR request has at least an audio input parameter, and may include additional parameters, as discussed in reference to FIG. 2.

In an embodiment, logic flow 600 may receive the SR request as a streamed request. For example, the SR request may include an audio URI that streams audio, known as remote streaming. This may occur, for example, if the URI is from a web service interface that returns audio as it is being recorded from an end user. In another example, the SR request may include streaming audio inline, known as inline streaming. In streaming, the audio content length is usually unknown at the time a request beings, therefore, in an embodiment, inline streaming may require that the audio be in a raw (headerless) format, and that the request is either explicitly non-persistent (for example, it is an HTTP/1.0 request, or an HTTP/1.1 request with a Connection: close header), or has an HTTP request entity body encoded with chunked Transfer-Encoding.

Logic flow 600 may perform speech recognition on the audio input according to the parameters, if any, in the SR request, in block 604. The parameters in the SR request may cause SR component 122 to alter its default performance. The parameters may also cause SR component 122 to retrieve grammar and/or audio resources. In an embodiment, SR server 120 or 320 may perform the speech recognition. In an embodiment, the device receiving the SR request may pass the request to a speech recognition engine, or may distribute the SR request to one or more threads or processors. In the event that no other parameters are specified, SR server 120 or 130 may use built-in or default parameters to perform the request.

Logic flow 600 may return the speech recognition result as an HTTP response, in block 606. In an embodiment, the response may include an HTTP 200 OK response with an XML document in the response's entity body. The XML document may be in Extensible MultiMedia Annotation (EMMA) format. The XML document may include a status attribute on the root <emma:emma/> element with an overall success or failure flag. The XML document may also include a top-level <emma:info/> block with some API specific XML within it, such as, for example, a session ID, and a request ID. The status attribute may include either the literal string OK or the string ERROR, to indicate success or failure, respectively. API endpoints may insert other, endpoint-specific data in the top-level <emma:info/> block, as allowed by the EMMA standard.

In an embodiment, the speech recognition result may be streamed to the requesting client. SR server 120 or 320 may begin providing the speech recognition results as soon as they are developed, rather than waiting for the entire audio input to be recognized.

Figure 7:
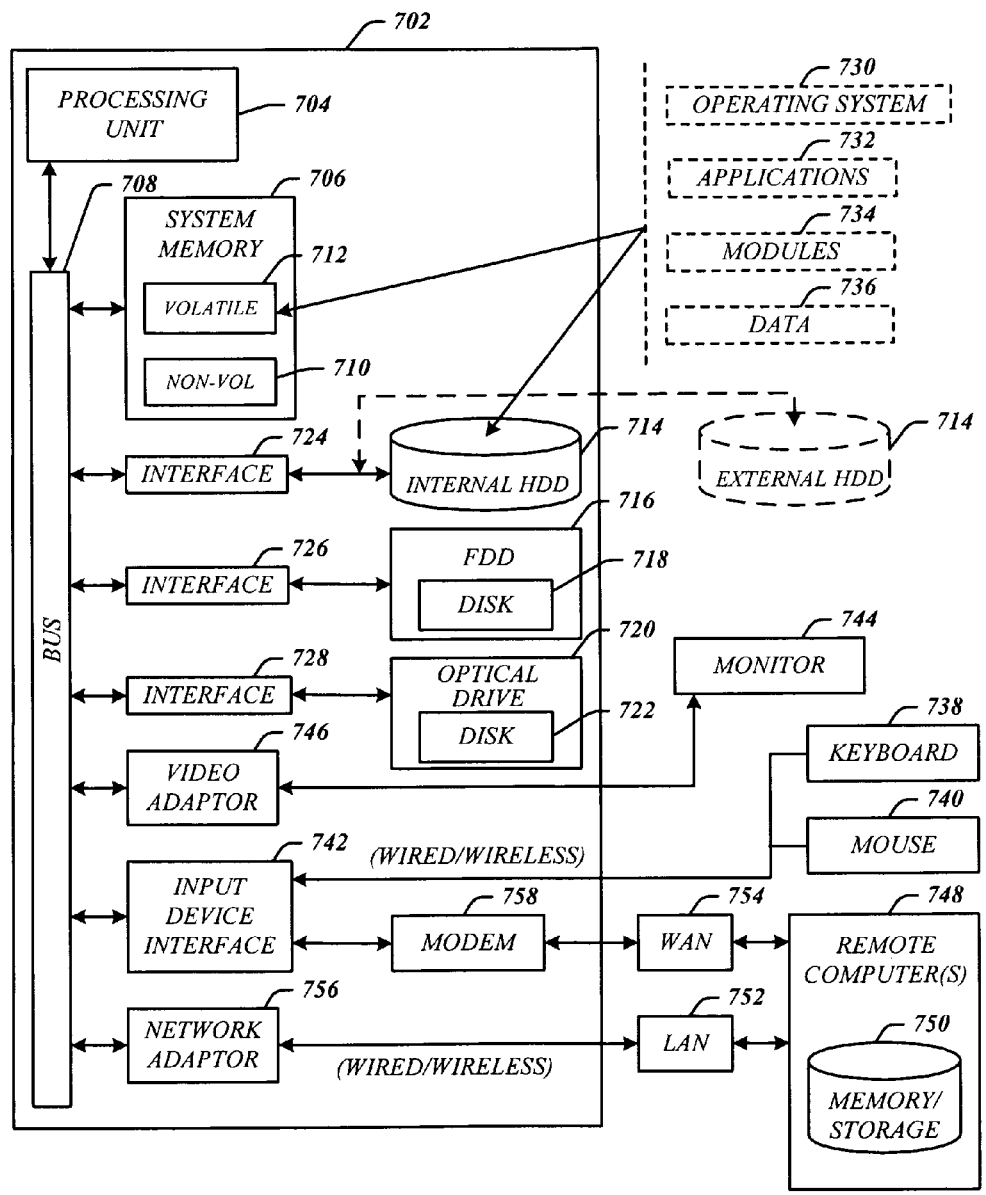
FIG. 7 illustrates an embodiment of a computing architecture.

FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, client application 110, speech recognition component 122, API 128, etc.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
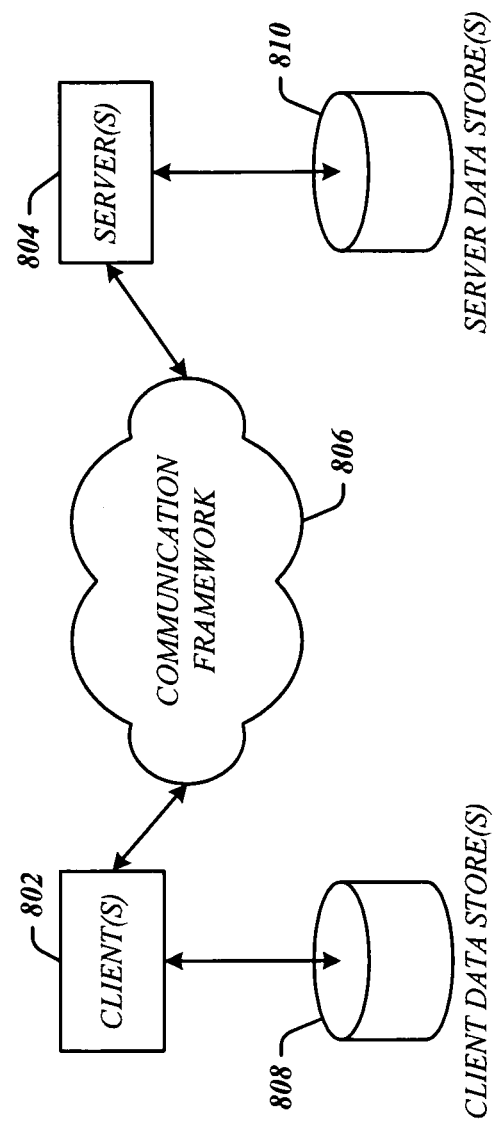
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client device 102. The servers 804 may implement the SR server 120, and/or SR service server 320. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
   accepting a speech recognition request via an application program interface (API), the request comprising an audio input and parameters including a uniform resource identifier (URI) link to a length of silence to observe, a grammar, and a grammar weight;
   performing speech recognition on the audio input according to the request; and
   upon observing the length of silence in the audio input, returning a plurality of speech recognition results based on the request as hypertext protocol (HTTP) responses comprising an extensible markup language (XML) document formatted in a format that includes a status attribute indicating an overall success or failure of speech recognition on the audio input, wherein at least one of the plurality of speech recognition results and the status attribute are returned prior to performing speech recognition on all of the audio input in the request.

2. The method of claim 1, wherein the speech recognition request is formatted as at least one of:
   an HTTP query string;
   an HTTP POST entity body; and
   at least one HTTP POST entity body part.

3. The method of claim 1, wherein the speech recognition request comprises parameters including at least one of:
   an in-line grammar;
   an in-line audio input;
   a URI link to an audio input;
   a timeout;
   a finalize timeout;
   a confidence level;
   a sensitivity level;
   a speed level;
   an accuracy level;
   a speaker parameter; and
   a recognizer specific parameter.

4. The method of claim 1, wherein the request is an inline streaming request, wherein the audio input is in a raw format.

5. The method of claim 1, comprising returning the speech recognition results as a streamed result.

6. The method of claim 1, wherein the request is a streamed request.

7. An article comprising a storage memory unit containing instructions that when executed enable a system to:
   provide an application program interface (API) operative to receive from a computing device a speech recognition request comprising an audio input and at least two parameters including a uniform resource identifier (URI) link to a grammar, a grammar weight, and a length of silence to observe in the audio input; and
   return, from a speech recognition engine to the computing device, a first speech recognition result associated with the streamed speech recognition request as a first hypertext protocol (HTTP) response after the length of silence is observed and prior to returning a second speech recognition result associated with the streamed speech recognition request as a second HTTP response, the first and second HTTP responses comprising an extensible markup language (XML) document formatted in a format that includes a status flag indicating an overall success or failure of the speech recognition result for the audio input.

8. The article of claim 7, wherein the speech recognition request is a streamed speech recognition request.

9. The article of claim 7, further comprising instructions that when executed enable the system to return speech recognition results from a request comprising at least one of an HTTP query string; an HTTP POST entity body; and at least one HTTP POST entity body part.

10. The article of claim 7, further comprising instructions that when executed enable the system to recognize speech from the audio input according to the speech recognition request.

11. The article of claim 10, further comprising instructions that when executed enable the system to recognize speech according to at least one parameter in the speech recognition request, the at least one parameter comprising at least one of:
   an in-line grammar;
   an in-line audio input;
   a URI link to an audio input;
   a timeout;
   a finalize timeout;
   a confidence level;
   a sensitivity level;
   a speed level;
   an accuracy level;
   a speaker parameter; and
   a recognizer specific parameter.

12. The article of claim 7, further comprising instructions that when executed enable the system to accept the request as an inline streaming request, wherein the audio input is in a raw format.

13. The article of claim 7, further comprising instructions that when executed enable the system to return the speech recognition results as a streamed result.

14. An apparatus, comprising:
   a processor;
   an application program interface (API) operative to provide an interface for building a speech recognition request comprising audio input and parameters including a uniform resource identifier (URI) link to a grammar, a grammar weight, and a specified duration of the audio input;

a speech recognition (SR) component operative on the processor to receive the speech recognition request, to convert a first portion of the audio input to a first recognition result associated with the speech recognition request, to return the first recognition result after silence is observed for the specified duration of the audio input, to convert a second portion of the audio input to a second recognition result associated with the speech recognition request, and to return the second recognition result, wherein the first and second recognition results are returned as a hypertext protocol (HTTP) responses comprising an extensible markup language (XML) document formatted in a format that includes a status flag indicating an overall success or failure of the recognition result.

15. The apparatus of claim 14, wherein the speech recognition request is a streamed speech recognition request.

16. The apparatus of claim 14, wherein the speech recognition request comprises at least one of:

an in-line grammar;
an in-line audio input;
a URI link to an audio input;
a timeout;
a finalize timeout;
a confidence level;
a sensitivity level;
a speed level;
an accuracy level;
a speaker parameter; and
a recognizer specific parameter.

17. The apparatus of claim 14, wherein the API comprises a wrapper for building a speech recognition request.

18. The apparatus of claim 14, wherein the SR component is operative to at least one of:

receive the speech recognition request as a streamed request; and
return the recognition results as a streamed result.

19. The apparatus of claim 16, wherein at least one of the in-line grammar or the grammar referred to by the URI link includes a reference to another grammar, and wherein the SR component is operative to retrieve said another grammar.

\* \* \* \* \*